(12) United States Patent
Huff et al.

(10) Patent No.: US 8,997,054 B2
(45) Date of Patent: Mar. 31, 2015

(54) SOFTWARE APPLICATION CERTIFICATION SERVICE

(75) Inventors: David P. Huff, Raleigh, NC (US); Norman L. Faus, Holly Springs, NC (US)

(73) Assignee: Red Hat, Inc., Raleigh, NC (US)

( * ) Notice: Subject to any disclaimer, the term of this patent is extended or adjusted under 35 U.S.C. 154(b) by 1883 days.

(21) Appl. No.: 11/948,654

(22) Filed: Nov. 30, 2007

(65) Prior Publication Data

US 2009/0144837 A1 Jun. 4, 2009

(51) Int. Cl.
- G06F 9/44 (2006.01)
- G06F 9/445 (2006.01)
- G06F 11/36 (2006.01)

(52) U.S. Cl.
CPC .................................. *G06F 11/3668* (2013.01)
USPC ............................ 717/126; 717/121; 717/175

(58) Field of Classification Search
None
See application file for complete search history.

(56) References Cited

U.S. PATENT DOCUMENTS

| | | | |
|---|---|---|---|
| 5,935,243 A * | 8/1999 | Hasebe et al. | 726/26 |
| 6,543,047 B1 * | 4/2003 | Vrhel et al. | 717/121 |
| 6,889,209 B1 * | 5/2005 | Rabin et al. | 705/57 |
| 6,931,545 B1 * | 8/2005 | Ta et al. | 726/10 |
| 7,096,455 B2 * | 8/2006 | Santiago | 717/114 |
| 7,113,912 B2 * | 9/2006 | Stefik et al. | 705/300 |
| 7,131,144 B2 * | 10/2006 | Rabin et al. | 726/30 |
| 7,266,808 B2 * | 9/2007 | Kolawa et al. | 717/126 |
| 7,337,330 B2 * | 2/2008 | Gatto et al. | 713/191 |
| 7,392,523 B1 * | 6/2008 | Stahl et al. | 717/177 |
| 7,398,524 B2 * | 7/2008 | Shapiro | 717/175 |
| 7,406,593 B2 * | 7/2008 | Rabin et al. | 713/150 |
| 7,594,217 B2 * | 9/2009 | Beisiegel et al. | 717/107 |
| 7,644,393 B2 * | 1/2010 | Glerum et al. | 717/127 |
| 7,703,073 B2 * | 4/2010 | Illowsky et al. | 717/121 |
| 7,734,549 B2 * | 6/2010 | Dabbish et al. | 705/59 |
| 7,747,980 B2 * | 6/2010 | Illowsky et al. | 717/107 |
| 7,752,140 B1 * | 7/2010 | Xu et al. | 705/59 |
| 7,756,945 B1 * | 7/2010 | Andreessen et al. | 709/217 |
| 7,765,322 B2 * | 7/2010 | Gale et al. | 709/240 |
| 7,788,181 B2 * | 8/2010 | Ben-Menahem et al. | 705/59 |
| 7,827,531 B2 * | 11/2010 | Sen et al. | 717/124 |
| 7,913,081 B2 * | 3/2011 | Li et al. | 713/157 |
| 7,938,726 B2 * | 5/2011 | Brunet de Courssou | 463/42 |
| 8,020,153 B2 * | 9/2011 | Aoshima et al. | 717/126 |
| 8,196,102 B2 * | 6/2012 | Weiss | 717/121 |
| 8,296,445 B1 * | 10/2012 | Hackborn et al. | 709/228 |
| 8,321,859 B2 * | 11/2012 | Shapiro | 717/175 |
| 8,332,823 B2 * | 12/2012 | Yamamoto et al. | 717/126 |
| 8,572,598 B1 * | 10/2013 | Kumar et al. | 717/168 |
| 8,789,037 B2 * | 7/2014 | De Atley et al. | 717/175 |
| 2002/0099951 A1 * | 7/2002 | O'Connor | 713/200 |
| 2002/0116615 A1 * | 8/2002 | Nguyen et al. | 713/168 |
| 2003/0220882 A1 * | 11/2003 | Rabin et al. | 705/57 |
| 2004/0054988 A1 * | 3/2004 | Atallah et al. | 717/122 |
| 2004/0128515 A1 * | 7/2004 | Rabin et al. | 713/176 |
| 2004/0260702 A1 * | 12/2004 | Cragun et al. | 707/100 |

(Continued)

*Primary Examiner* — Tuan Q. Dam
*Assistant Examiner* — Zheng Wei
(74) *Attorney, Agent, or Firm* — Lowenstein Sandler LLP

(57) ABSTRACT

An embodiment relates to a method of providing certification. The method includes providing for a software application and applying a set of certification metatags to the software application. The set of certification metatags configured to provide at least one parameter to become certified with the software application. The method also includes querying the set of certification metatags by a second application to determine whether the second application can be certified with the software application.

19 Claims, 5 Drawing Sheets

(56) References Cited

U.S. PATENT DOCUMENTS

| | | | |
|---|---|---|---|
| 2005/0071871 A1* | 3/2005 | Yuzawa | 725/48 |
| 2005/0204345 A1* | 9/2005 | Rivera et al. | 717/127 |
| 2005/0262086 A1* | 11/2005 | Ta et al. | 707/9 |
| 2005/0262484 A1* | 11/2005 | Glerum et al. | 717/130 |
| 2006/0093149 A1* | 5/2006 | Zhu et al. | 380/277 |
| 2006/0122958 A1* | 6/2006 | Beisiegel et al. | 707/1 |
| 2006/0129994 A1* | 6/2006 | Srivastava et al. | 717/124 |
| 2006/0206867 A1* | 9/2006 | Parsons et al. | 717/124 |
| 2006/0287959 A1* | 12/2006 | Blecken | 705/59 |
| 2007/0136207 A1* | 6/2007 | Davydov et al. | 705/57 |
| 2007/0150294 A1* | 6/2007 | Rusman et al. | 705/1 |
| 2007/0150418 A1* | 6/2007 | Ben-Menahem et al. | 705/59 |
| 2007/0226691 A1* | 9/2007 | Happell et al. | 717/124 |
| 2007/0226693 A1* | 9/2007 | Chatlain et al. | 717/126 |
| 2008/0184203 A1* | 7/2008 | Yan | 717/126 |
| 2009/0100411 A1* | 4/2009 | Weiss | 717/124 |
| 2010/0138933 A1* | 6/2010 | Yamashita | 726/30 |

* cited by examiner

SOFTWARE APPLICATION CERTIFICATION SERVICE

FIELD

This invention relates generally to software application, more particularly, to systems and methods for a software application certification service.

DESCRIPTION OF THE RELATED ART

Computers and software applications have become a way of life for the majority of society. Anytime a software application fails, businesses/governments incur losses through lost worker productivity, lost revenue, lost potential sales, lost customers, lost or corrupted data, and expenses necessary to bring systems back up, and to recover and reconstitute data.

In spite of the overwhelming dependence on software, businesses today have little basis on which to judge the quality of software in order to make informed software procurement decisions. Currently, businesses rely on the reputation of the software vendor, software vendor marketing, anecdotal evidence from colleagues, and published software reviews in order to decide which software applications to buy.

However published reviews have drawbacks and disadvantages. For example, published reviews rarely deal with the quality of the software, nor can the authors test the software as they do not have adequate time or resources. Accordingly, businesses rarely have an independent, third-party appraisal of the quality of software on which their businesses will depend prior to buying the software.

The other issue software applications is software certification. Software certification is a guarantee that differing software applications can work together. In spite of the fact that there are multiple vendors and each vendor is developing their respective software on their own standard. For example, it can be comparatively easy for a proprietary software vendor (e.g., Microsoft) to certify an application if they own all the components. Accordingly, a customer can get certification that all the components will work together. However, if a customer wants to swap out a proprietary component with another vendor's component, the proprietary vendor will not support or certify the third party component.

Accordingly, there is a need in the art for a mechanism for a common language that defines how applications work together despite the fact that the applications may be from different vendors.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
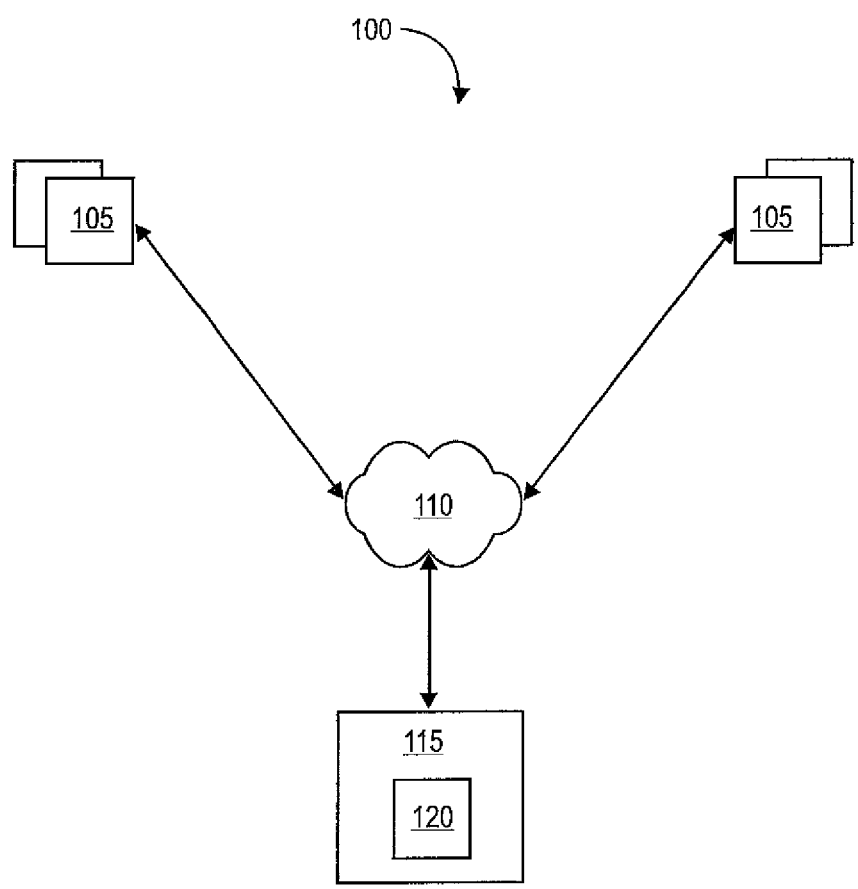
FIG. 1 depicts an exemplary system in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of software applications, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems and methods for software certification of applications. More particularly, embodiments provide for a common language that allows applications to communicate with each other, where the common language describes the parameters of the integration. The common language is based on a set of certification metatags that can be attached to a software application. The certification metatags can specify the parameters of integration with the software application, i.e., similar to a configuration file. The certification metatags can specify the components that are supported by the software application; the dependencies of the software application such as operating components, hardware components, any supporting software, utilities, etc., what the software application expects from other applications such as data formats, communication protocols, etc., and what the software application can provide to other applications. Accordingly, by interrogating the certification metatags, other software developers can determine the parameters to integrate their own software with the software application.

As a result, software developers can view their products as components that other software developers can build upon. For example, a third party software distributor can provide an electronic mail (email) program with a SQL database server backend. The certification metatags associated with the electronic mail program can specifies the integration parameters with the SQL database. Accordingly, the software distributor can support and certify any number of SQL database products from different vendors (proprietary to open source) as long as those products meet the requirements set forth by the certification metatags. Although each product from each vendor may offer many additional and different features, each product can be certified that will integrate with the base product as long as they meet the minimum requirements of the certification metatags.

Embodiments of the certification metatags can also streamline the testing process. Continuing on with the above-mentioned example, a configuration of the email program with a selected SQL database program, a set of quality assurance test can be executed on the selected configuration based on the certification metatags. Regression tests can then be applied to the rest of the SQL database products. The results can then be combined for certification of all SQL products with the email program.

Embodiments of the certification metatags can provide assistance to program interoperability. More particularly, certification metatags can further describe services of each software application. As a result, a third party distributor of software can provide a number of products that interact with a selected software application, where each product is certified to operate with the selected software application.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes users 105, a network 110 and a web service portal 115. The users 105 can be private individuals, employees of private business or public entities or other persons interested in accessing the web service portal 115. The users 105 can access the web service portal 115 using personal computers, personal mobile devices, workstations or other networked computing platforms.

The network 110 can be a combination of wide area and local area networks such as the Internet. The network 110 can be configured to provide a communication channel between the users 105 and the web service portal 115. The network 110 can implement a variety of network protocols to provide the communication channel such as Internet Protocol ("IP") Vx, ATM, SONET, or other similar network protocols.

The web service portal 115 can be configured to provide products and services to the user 105 as well as provisioning, installation services, updates to software and hardware products and technical support. The web service portal 115 can, among other functions, provide a list of products such as software applications and/or hardware devices as well as services such as installation, configuration, maintenance, etc., for users to purchase. As a non-limiting example, the web service portal 115 can also provide information for users to research, compare and purchase software, hardware and consulting services in support of those software and/or hardware purchases. The web service portal 115 can also be configured to provide support services by subscription to those same software, service, and/or hardware purchases.

In accordance with various embodiments, the web service portal 115 can be configured to provide a certification module 120 to manage and certify new applications from vendors with existing certified applications. More specifically, the certification module 120 can be configured receive an application and query the associated certification metatags. The certification module 120 can be configured to classify the received application as either a precursor application (i.e., the application functions as a component in an application stack) or a complementary application (i.e., an application that operates in conjunction with a selected application).

If the received application is not a new application, the certification module 120 can be configured to store the received application with the other complementary applications. Otherwise, if the certification module 120 determines that the received application is a precursor application, the certification module 120 can be configured to determine whether the received application is a new application (i.e., hasn't been tested with quality assurance tests). If the received application is a new application, the certification module 120 can be configured to form an application stack and apply a single set of quality of assurance tests on the formed application stack. Otherwise, if the application is not a new application, the certification module 120 can be configured to retrieve the results for the formed application stack and apply a regression analysis to determine whether the application is certified. If the received application is certified, the received application can then be stored with the other precursor applications. Otherwise, the vendor of the received application is notified that the received application did not certify.

Figure 2:
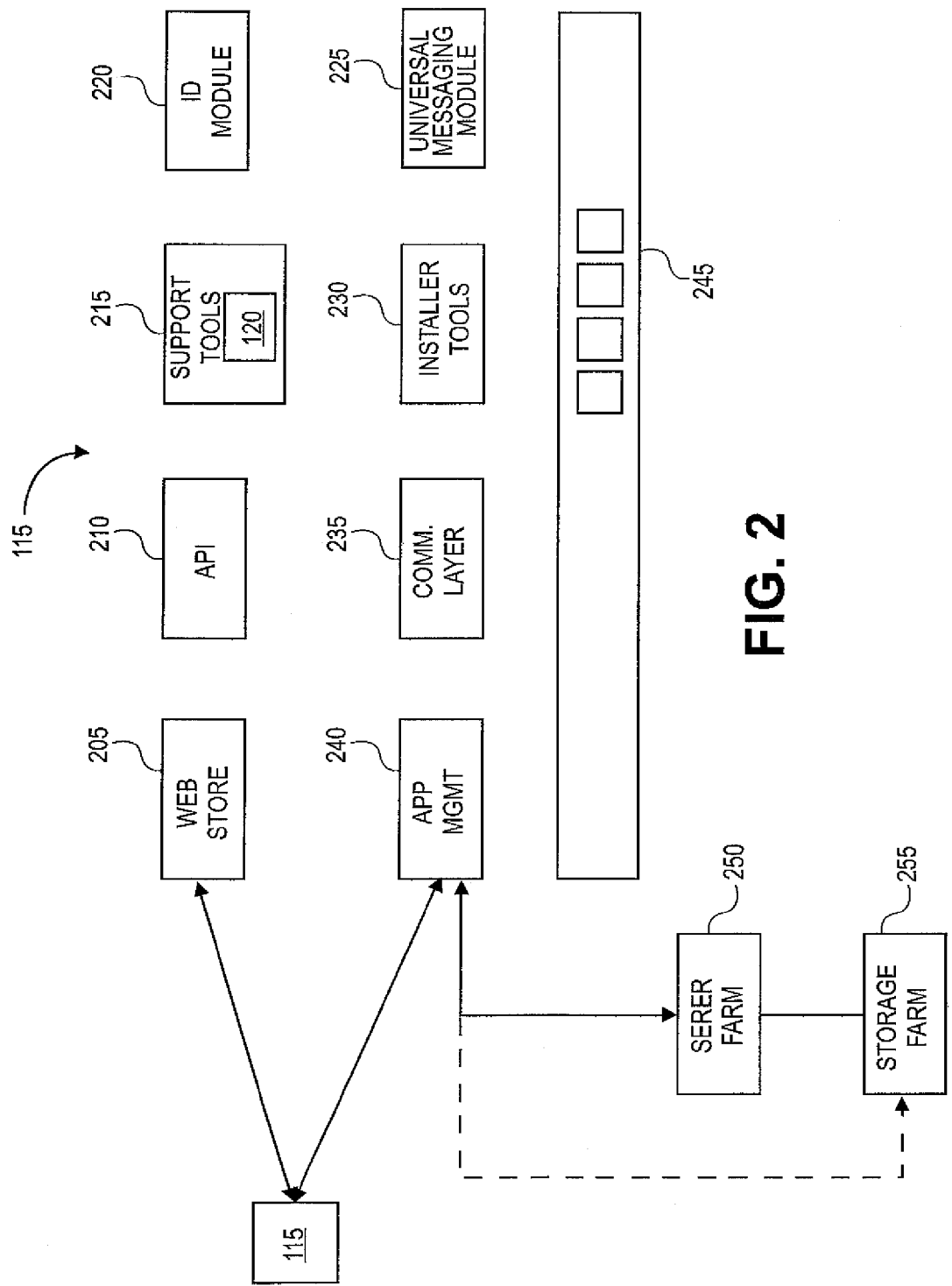
FIG. 2 illustrates an exemplary service portal of the system shown in FIG. 1 in accordance with another embodiment.

FIG. 2 illustrates a more detailed block diagram of the web service portal 115 in accordance with another embodiment. It should be readily apparent to those of ordinary skill in the art that the web service portal 115 depicted in FIG. 2 represents a generalized schematic illustration and that other components may be added or existing components may be removed or modified.

As shown in FIG. 2, the web service portal 115 can include a web store module 205 that a user can interface with the service portal. The web store module 205 can provide the graphical user interfaces ("GUIs") and associated functions and/or services for the web service portal 115. As a non-limiting example, the web store module 205 can generate a log-in GUI for a user to authenticate and enter the web service portal 115.

The web store module 205 can couple with an application program interface ("API") module 210. The API module 210 can be configured to provide an interface between the functions and/or services provided by the web store module 205 and to the appropriate module of the web service portal 115. More particularly, the API module 210 can call or direct a requested function or service from the user to the respective module that provides that requested function or service. For example, a user may request a price of a product, e.g., an electronic mail program, the API module 210 can direct the request to a get price function in a support tools module 215.

The API module 210 can also be configured to interface with the support tools module 215. The support tools module 215 can be configured to provide the supporting software and hardware to implement the functionality of the web service portal 115. The support tools module 215 can contain and provide access to databases that contain information such as products lines, services providers, on-line self-help (e.g., knowledgebase), etc. The support tools module 215 can also provide services like a chat services, a help desk, installation, provisioning, etc.

The API module 210 can be further configured to couple with an identification ("ID") module 220. The ID module 220 can be configured to provide identification management services for the web service portal 115. The ID module 220 can also store information related to users such as purchase history, user profile, usage history of the user, and entitlement data.

The API module 210 can be further configured to couple with a universal messaging module 225. The universal messaging module 225 can be configured to provide a messaging application that unifies messages. More specifically, electronic mail ("email"), documents, and instant messaging can be linked in a single application. The universal messaging module 225 can also provide a mechanism for a user to view all the related documents for the user from email to Wiki pages.

An installer tools 230 can be coupled to the API module 210. One of the services provided by the web service portal 115 can be the purchase of software applications provided by independent software vendors ("ISVs"). As part of the delivery of the software applications, the ISV can be required to maintain and update the installation tools to install their respective software applications. Accordingly, the installer tools 230 can be a repository where independent software vendors can deposit their respective installation tools.

The API module 210 can be further coupled to the communication layer 235 (labeled as COMM layer in FIG. 2). The communication layer 235 can be configured to provide the underlying services for the modules of the web service portal 115 to communicate. For example, the communication layer 235 can contain middleware for a product database to communicate with a graphical user interface requesting product description.

The API module 210 can be further coupled to an application management module 240 (labeled as APP MGMT in FIG. 2). The application management module 240 can be configured to manage applications as requested by users. More specifically, a user may purchase a prepackaged software application pack (e.g., an operating system, electronic mail program and data mining program) from the web service portal 115, which is stored in an application stack module 245. The application management module 240 can then deliver the purchased software stack, install and configure the software application stack at a third party site such as server farm 250 or store the software application stack in a storage farm 255 for the user to retrieve.

The server farm 250 can be configured to provide computing platforms for users to lease. Accordingly, users can have a backup version of their systems, a testing platform to perform quality assurance tests on new applications, execute a program requiring excessive MIPS, or any other similar computing task.

The storage farm 255 can be configured to provide storage space for users to lease. Accordingly, users can lease disk storage space to back up data, provide a hot data swap, or other storage intensive tasks.

In some embodiments, the certification module 120 can be configured to be executed in the support tools module 215. In other embodiments, the certification module 120 can be a module of the application management module 240. The yet other embodiments, the certification module 120 can be executed as a standalone module.

Figure 3:
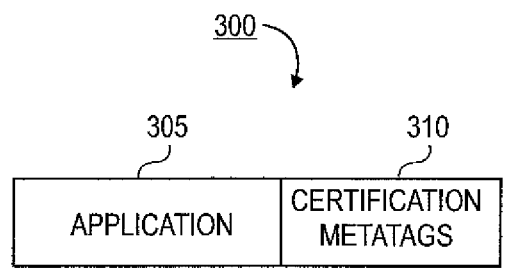
FIG. 3 depicts an exemplary application and associated certification metatags in accordance with various embodiments.

FIG. 3 depicts a more detailed block diagram of the certification metatags in accordance with another embodiment. It should be readily apparent to those of ordinary skill in the art that the certification metatags depicted in FIG. 3 represents a generalized schematic illustration and that other components may be added or existing components may be removed or modified.

As shown in FIG. 3, a certification package 300 can comprise an application 305 and associated certification metatags 310. The application 305 can be any type of software application such as an electronic mail program, database, work processing, network monitoring, or any other type of software. The certification metatags 310 can be a set of metatags that define the parameters of integration for the application 305, i.e., similar to a configuration file, for precursor applications, where precursor applications can be the components of a selected application stack. The certification metatags 310 can specify the components that are supported by the software application; the dependencies of the software application such as operating components, hardware components, any supporting software, utilities, etc., what the software application expects from other applications such as data formats, communication protocols, etc., and what the software application can provide to other applications. Accordingly, by interrogating the certification metatags 310, other software developers can determine the parameters to integrate their own software with the software application in an application stack.

The certification metatags 310 can also provide a description of service provided by the application 3 05. As a result, a third party distributor of software can provide a number of products that interact with a selected software application, where each product is certified to provide the serviced required by the selected software application.

Figure 4:
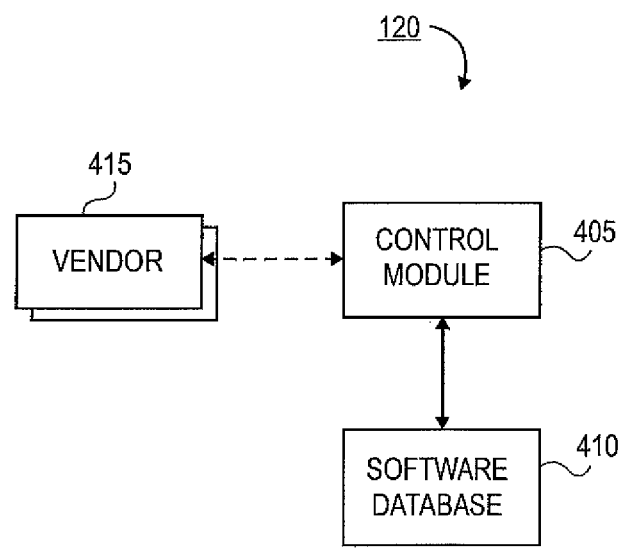
FIG. 4 illustrates an exemplary detailed block diagram of the certification module in accordance with various embodiments.

FIG. 4 shows an exemplary block diagram of the certification module 120 in accordance with various embodiments. It should be readily apparent to those of ordinary skill in the art that the certification module 120 depicted in FIG. 4 represents a generalized schematic illustration and that other components may be added or existing components may be removed or modified.

As shown in FIG. 4, the certification module 120 can comprise a control module 405 and a software database 410. It should be readily obvious to one of ordinary skill in the art that the modules 405-410 can be implemented as software applications (programmed in C, C++, JAVA, PHP, etc.), hardware components (EEPROM, application specific integrated circuit, microprocessor, etc.) or combinations thereof.

The control module 405 can be configured to manage and interface with the software database 410 to provide the functionality of the certification module 120 as described above and further described herein below. The software database 410 can be configured to store certified applications, which can be divided into precursor applications and complementary applications. The precursor applications can be applications that can be selected as components of an application stack. For example, an electronic mail program coupled with a back end SQL database server can be considered an application stack, where the electronic mail program and SQL database server are considered components.

The control module 405 can be coupled with vendors 415 of software application in a variety of methods. In some embodiments, there may be a direct connection from the vendors to the certification module 120. In other embodiments, vendors 415 may forward potential certified applications through the web store module 205 or the application management module 240.

Accordingly, the control module 405 can receive new applications from the vendors 415 and query the associated certification metatags 410. The control module 405 can be configured to classify the received application as either a precursor application (i.e., the application functions as a component in an application stack) or a complementary application (i.e., an application that operates in conjunction with a selected application).

If the received application is not a new application, the control module 405 can be configured to store the received application with the other complementary applications in software database 410. Otherwise, if the control module 405 determines that the received application is a precursor application, the control module 405 can be configured to determine whether the received application is a new application (i.e., hasn't been tested with quality assurance tests). If the received application is a new application, the control module 405 can be configured to form an application stack and apply a single set of quality of assurance tests on the formed application stack. Otherwise, if the application is not a new application, the control module 405 can be configured to retrieve the results for the formed application stack and apply a regression analysis to determine whether the application is certified. If the received application is certified, the received application can then be stored with the other precursor applications in the software database 410. Otherwise, the vendor of the received application can then be notified that the received application did not certify.

Figure 5:
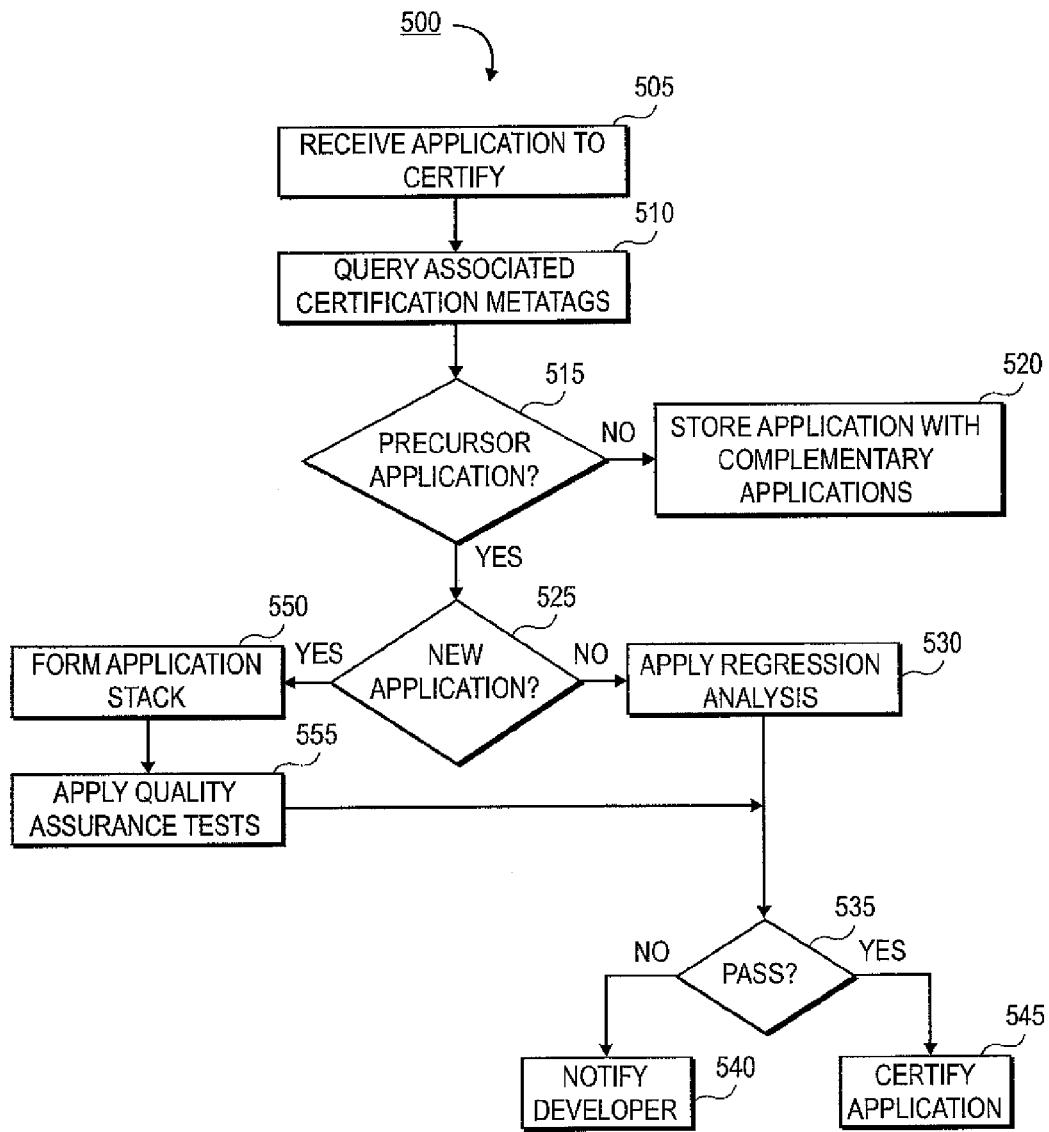
FIG. 5 depicts an exemplary flow diagram in accordance with yet another embodiment.

FIG. 5 illustrates a flow diagram 500 in accordance with yet another embodiment. It should be readily apparent to those of ordinary skill in the art that the flow diagram 500 depicted in FIG. 5 represents a generalized schematic illustration and that other steps may be added or existing steps may be removed or modified.

As shown in FIG. 5, the control module 405 can be configured to receive a new application from a vendor 415, in step 505. More particularly, the received application can be received through the application management module 240 from a software developer. The control module 405 can then buffer the received application.

In step 510, the control module 405 can be configured to query the associated certification metatags of the received application. More specifically, the control module 405 determine the type of application, i.e., precursor or complementary, the received application is by the content of the certification metatags 410.

In step 515, the control module 405 can be configured to determine the type of application the received application. If the received application is a complementary application, the control module 405 can then store the received application with the other complementary application in the software database 410, in step 520. Otherwise, the control module 405 can be configured to determine whether the received application is a "new" application, i.e., whether the received application is a new type of software application compared to the existing types of software applications stored in the software database 410, in step 525.

If the received application is a new application, the control module 405 can be configured to form an application stack with any compatible application from the software database 410 as specified by the certification metatags of the received application, in step 550. The control module 405 can-then apply a single set of quality assurance tests on the application stack, in step 555. Subsequently, the results of the quality assurance tests are buffered. If the results are unsatisfactory, in step 535, the control module 405 can be configured to notify the developer of the non-certification, in step 540. Otherwise, if the results are satisfactory from step 555, the control module 405 can be configured to certify the received application, in step 545. Subsequently, the control module 405 can store the received application with the precursor application in the software database 410.

Returning to step 525, if the received application is not a new application, the control module 405 can be configured to apply a regression analysis to the received application. More particularly, since the received application is now considered an existing component of an existing application stack, the control module 405 can retrieve the quality assurance tests for the existing application stack. The control module 405 can then apply regression analysis based on the results from the quality assurance tests to determine whether or not to certify the received application, in step 535.

If the results from the regression analysis are unsatisfactory in step 535, the control module.405 can be configured to notify the developer in step 540. Otherwise, the control module 405 can certify the received application, in 545 and subsequently store the received application in the software database 410.

Figure 6:
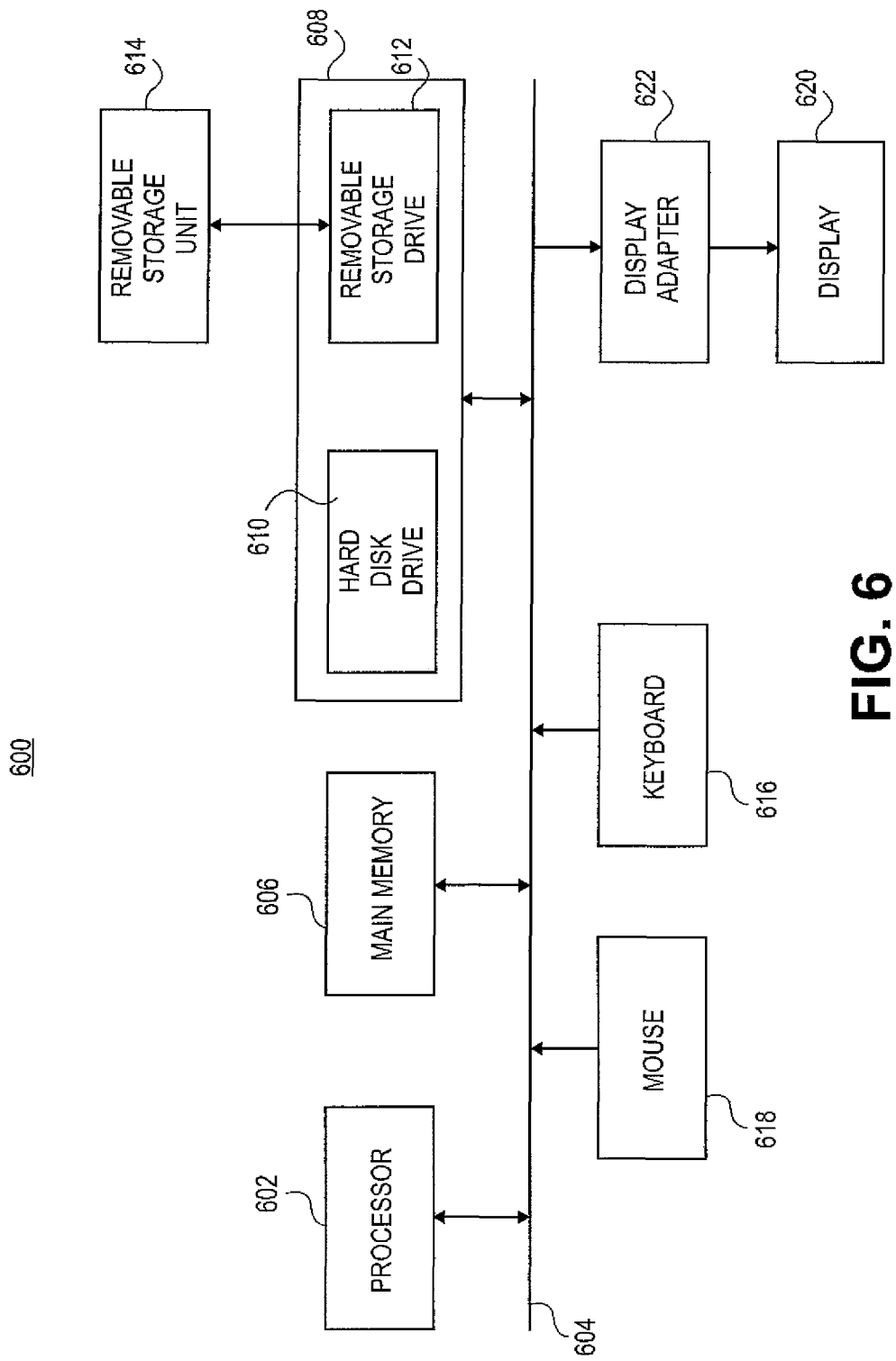
FIG. 6 shows an exemplary computing system in accordance with yet another embodiment.

FIG. 6 illustrates an exemplary block diagram of a computing system 600 where an embodiment may be practiced. The functions of the certification module 120 may be implemented in program code and executed by a computing platform. The certification module 120 may be implemented in computer languages such as PASCAL, C) C++, JAVA, etc.

As shown in FIG. 6, the computer system 600 includes one or more processors, such as processor 602 that provide an execution platform for embodiments of the certification module 120. Commands and data from the processor 602 are communicated over a communication bus 604. The computer system 600 also includes a main memory 606, such as a Random Access Memory (RAM), where the certification module 120 may be executed during runtime, and a secondary memory 608. The secondary memory 608 includes, for example, a hard disk drive 610 and/or a removable storage drive 612, representing a floppy diskette drive, a magnetic tape drive, a compact disk drive, etc., where a copy of a computer program embodiment for the certification module 120 may be stored. The removable storage drive 612 reads from and/or writes to a removable storage unit 614 in a well-known manner. A user interfaces with the certification module 120 with a keyboard 616, a mouse 618, and a display 620. A display adapter 622 interfaces with the communication bus 604 and the display 620. The display adapter 622 also receives display data from the processor 602 and converts the display data into display commands for the display 620.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
  receiving, by a computing system, a software application from a software vendor, the software application comprising a set of certification metatags describing one or more components supported by the software application;
  determining that the software application is a precursor application using content of the set of certification metatags, wherein the precursor application is a component of an application stack;
  determining whether the software application is an existing component of an existing application stack or is a new type of software application by comparing a type for the software application to a plurality of types of software applications that are stored in a database;

applying a regression analysis to the software application to determine whether to certify the software application in view of a determination that the software application is an existing component of an existing application stack; and in view of a determination that the software application is a new type of application:
- identifying, using the set of certification metatags, a compatible software application from a plurality of software applications stored in the database,
- forming a new application stack with the compatible software application,
- applying a plurality of quality assurance tests on the new application stack, and
- determining whether to certify the software application in view of applying the plurality of quality assurance tests on the new application stack.

2. The method of claim 1, further comprising:
querying the set of certification metatags by a second software application to determine whether the second software application can be certified with the software application;
testing the second software application with at least one parameter specified by the set of certification metatags; and
certifying the second software application in response to a successful result of the testing.

3. The method of claim 1, wherein applying the plurality of quality assurance tests comprises:
providing a plurality of precursor applications to operate with the software application;
selecting a precursor application of the plurality of precursor applications as the compatible software application; and
testing the software application and the precursor application as the new application stack with a single set of quality assurance tests.

4. The method of claim 3, further comprising:
receiving results of the single set of quality assurance tests; and
applying regression analysis using remaining precursor applications of the plurality of precursor applications in response to the results being successful.

5. The method of claim 4, the method further comprising:
certifying the remaining precursor applications of the plurality of precursor applications with the software application in response to a successful passing of the regression analysis.

6. The method of claim 1, the method further comprising:
providing a plurality of complementary applications, each complementary application configured with a respective set of certification metatags to provide at least a description of a respective service;
interrogating the set of certification metatags of the software application to determine a desired service; and
selecting one of the plurality of complementary applications in response to the desired service.

7. A system comprising:
a memory to store a plurality of various types of software applications; and
a processor coupled to the memory to:
receive a software application from a software vendor, the software application comprising a set of certification metatags describing one or more component supported by the software application;
determine that the software application is a precursor application using the content of the set of certification metatags, wherein the precursor application is a component of an application stack;
determine whether the software application is an existing component of an existing application stack or is a new type of software application by comparing a type for the software application to a plurality of various types of software applications, the plurality of various types of software applications being stored in a database;
apply a regression analysis to the software application in view of a determination that the software application is an existing component of an existing application stack; and
in view of a determination that the software application is a new type of application:
- identifying, using the set of certification metatags, a compatible software application from a plurality of software applications stored in the database,
- forming a new application stack with the compatible software application,
- applying a plurality of quality assurance tests on the new application stack, and
- determining whether to certify the software application in view of applying the plurality of quality assurance tests on the new application stack.

8. The system of claim 7, wherein the processor is further to:
query the set of certification metatags to determine whether a second software application can be certified with the software application;
test the second software application with at least one parameter specified by the set of certification metatags; and
certify the second software application in response to a successful result of the testing.

9. The system of claim 7, wherein to apply the plurality of quality assurance tests comprises:
providing for a plurality of precursor applications to operate with the software application;
selecting a precursor application from the plurality of precursor applications as the compatible software application; and
testing the selected precursor application with the software application as the new application stack with a single set of quality assurance tests.

10. The system of claim 9, wherein the processor is further to:
receive results of the single set of quality assurance tests; and
apply regression analysis using remaining precursor applications of the plurality of precursor applications in response to the results being successful.

11. The system of claim 10, wherein the processor is further to:
certify the remaining precursor applications with the software application in response to a successful passing of the regression analysis.

12. The system of claim 7, wherein the processor is further to:
provide a plurality of complementary applications, each complementary application to provide at least a description of a respective service;

interrogate the set of certification metatags of the software application to determine a desired service; and select one of the plurality of complementary applications in response to the desired service.

13. The system of claim 12, wherein the certification module is further to:

classify the new application as a precursor application in response to the set of certification metatags of the new application matching the at least one parameter of the software application.

14. A non-transitory computer-readable storage medium including instructions that, when executed by a processor, cause the processor to perform operations comprising:

receiving, by the processor, a software application from a software vendor, the software application comprising a set of certification metatags describing one or more components supported by the software application;

determining that the software application is a precursor application using the set of certification metatags, wherein the precursor application is a component of an application stack;

determining whether the software application is an existing component of an existing application stack or is a new type of software application by comparing a type for the software application to a plurality of various types of software applications, the plurality of various types of software applications being stored in a database;

applying a regression analysis to the software application to determine whether to certify the software application in view of a determination that the software application is an existing component of an existing application stack; and in view of a determination that the software application is a new type of application:

identifying, using the set of certification metatags, a compatible software application from a plurality of software applications stored in the database, forming a new application stack with the compatible software application, applying a plurality of quality assurance tests on the new application stack, and determining whether to certify the software application in view of applying the plurality of quality assurance tests on the new application stack.

15. The non-transitory computer-readable storage medium of claim 14, the operations further comprising:

querying the set of certification metatags to determine whether a second software application can be certified with the software application testing the second software application with at least one parameter specified by the set of certification metatags; and certifying the second software application in response to a successful result of the testing.

16. The non-transitory computer-readable storage medium of claim 14, the operations further comprising:

providing a plurality of complementary applications, each complementary application configured with a respective set of certification metatags to provide at least a description of a respective service;

interrogating the set of certification metatags of the software application to determine a desired service; and selecting one of the plurality of complementary applications in response to the desired service.

17. The non-transitory computer-readable storage medium of claim 14, wherein applying the plurality of quality assurance tests comprises:

providing a plurality of precursor applications to operate with the software application;

selecting a precursor application of the plurality of precursor applications as the compatible software application; and testing the software application and the precursor application as the new application stack with a single set of quality assurance tests.

18. The non-transitory computer-readable storage medium of claim 17, the operations further comprising:

receiving results of the single set of quality assurance tests; and applying regression analysis using remaining precursor applications of the plurality of precursor applications in response to the results being successful.

19. The non-transitory computer-readable storage medium of claim 18, the operations further comprising:

certifying the remaining precursor applications of the plurality of precursor applications with the software application in response to a successful passing of the regression analysis.

* * * * *